B. F. PHELPS.
Device for Moving Railroad Cars.

No. 160,839. Patented March 16, 1875.

WITNESSES:
C. Neveux
A. F. Terry

INVENTOR:
B. F. Phelps
BY
ATTORNEYS.

UNITED STATES PATENT OFFICE.

BENJAMIN F. PHELPS, OF KANSAS CITY, MISSOURI.

IMPROVEMENT IN DEVICES FOR MOVING RAILROAD-CARS.

Specification forming part of Letters Patent No. 160,839, dated March 16, 1875; application filed February 13, 1875.

*To all whom it may concern:*

Be it known that I, BENJAMIN F. PHELPS, of Kansas City, in the county of Jackson and State of Missouri, have invented a new and useful Improvement in Device for Lifting and Moving Railroad-Cars, of which the following is a specification:

The object of this invention is to provide means for moving cars on railroads; and it consists in a lever slotted at the lower end, having a friction-wheel in the slot and a crab pivoted to its end. It also has a removable fulcrum composed of two bars attached to its sides, to the lower ends of which fulcrum-bars a self-adjusting crab is attached, as will be hereinafter more fully described.

Figure 1:
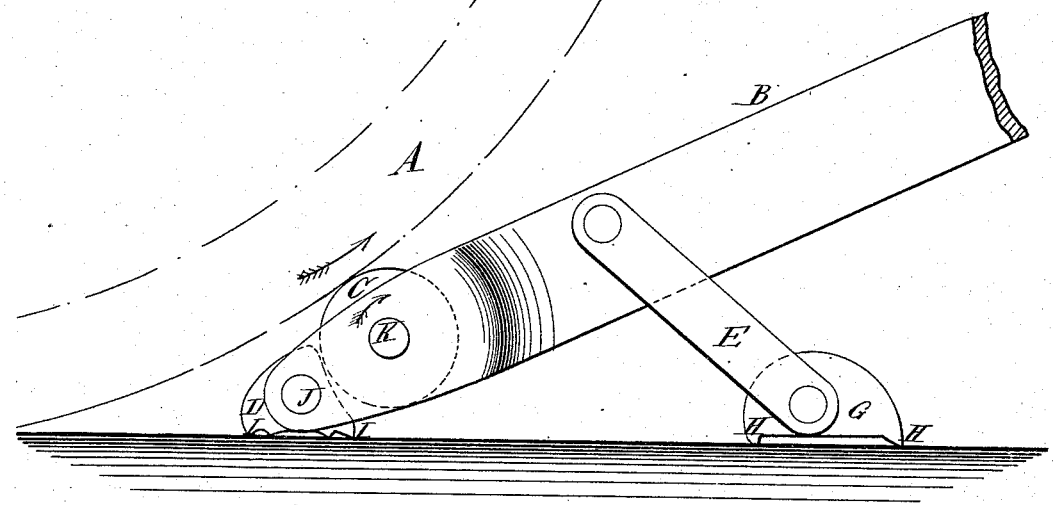
Figure 2:
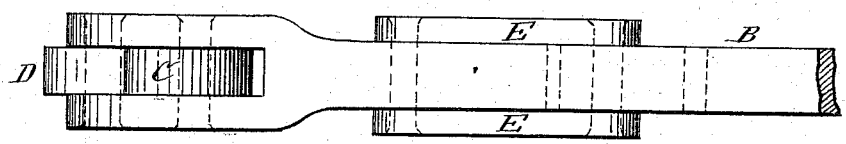

In the accompanying drawing, Figure 1 represents a side view, showing the lever as being applied to the wheel of the car. Fig. 2 is a top view of the lever with its attachments.

Similar letters of reference indicate corresponding parts.

A is the wheel of the car. B is the lever. C is the friction-wheel in the slot or fork of the lever. D is the crab at the end of the lever. E E are the fulcrum-bars, one of which is attached to each side of the lever by a joint-pin, F. G is the crab at the lower end, attached by a joint-pin, which renders it self-adjusting on the rail. This crab is made of steel, and has two (more or less) sharp edges, H, which enable it to catch and hold when the lever is applied. The crab D at the end of the lever is also self-adjusting, and has points or edges I, which enable it to hold on the rail when power is applied to the lever. In lifting on the lever, the joint-pin J of the crab D becomes a fulcrum. In either case, the motion of the car will revolve the friction-wheel C, and prevent all friction against the wheel. K is the joint-pin of the friction-wheel.

Having thus described my invention, I claim as new and desire to secure by Letters Patent—

A machine for lifting and moving railroad-cars, consisting of the lever B, friction-wheel C, fulcrum-bars E, and crabs D and G, arranged substantially as and for the purposes described.

BENJAMIN F. PHELPS.

Witnesses:
THOMAS HUDSON,
GEORGE MADDEN.